(12) United States Patent
de Witte et al.

(10) Patent No.: US 11,872,495 B1
(45) Date of Patent: Jan. 16, 2024

(54) METHOD AND SYSTEM FOR DETECTING COMMON VIDEOGAME GAMEPLAY

(71) Applicant: Medal B.V., Naarden (NL)

(72) Inventors: Wilhelmus Wilfried Alexander de Witte, Stow, OH (US); Zaid Deric Osama Elnasser, Bellevue, WA (US)

(73) Assignee: Medal B.V., Naarden (NL)

( * ) Notice: Subject to any disclaimer, the term of this patent is extended or adjusted under 35 U.S.C. 154(b) by 0 days.

(21) Appl. No.: 18/384,778

(22) Filed: Oct. 27, 2023

(51) Int. Cl.
*A63F 13/79* (2014.01)
*A63F 13/86* (2014.01)
*A63F 13/77* (2014.01)

(52) U.S. Cl.
CPC .............. *A63F 13/79* (2014.09); *A63F 13/77* (2014.09); *A63F 13/86* (2014.09)

(58) Field of Classification Search
None
See application file for complete search history.

(56) References Cited

U.S. PATENT DOCUMENTS

| 11,065,546 B1 * | 7/2021 | Lange | A63F 13/34 |
| 2014/0179425 A1 * | 6/2014 | Perry | A63F 13/63 463/31 |
| 2017/0225079 A1 * | 8/2017 | Conti | A63F 13/35 |
| 2021/0052981 A1 * | 2/2021 | Yi | G07F 17/3237 |
| 2022/0262020 A1 * | 8/2022 | Caldwell | A63F 13/75 |

* cited by examiner

*Primary Examiner* — Jason T Yen
(74) *Attorney, Agent, or Firm* — Woods Rogers; Timothy J. Bechen

(57) ABSTRACT

The method and system electronically detects users engaged in common gameplay using hash values generated based on image processing of designated portions of gameplay image capture. Portions are based on the game, common display area visible to all players. For each player running the executable application, these hash values are generated on an intermittent basis and the hash values are sent via a network connection to one or more hash databases. The method and system compares hash values to determine matches. Based on this detection, the method and system determines additional user(s) engaged in the common gameplay.

18 Claims, 5 Drawing Sheets

METHOD AND SYSTEM FOR DETECTING COMMON VIDEOGAME GAMEPLAY

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The present invention relates generally to processing videogame gameplay content and more specifically to detecting common videogame gameplay.

BACKGROUND

There are well established technologies for capturing and distributing videogame gameplay content. There are existing platforms for viewing this gameplay content. Gameplay content can include livestreaming content concurrent with the actual gameplay, as well as recorded content from prior gameplay. Gameplay content can run the gamut of duration, from an extended period of time up to several hours, as well as short clips lasting several seconds to several minutes.

In the videogame community, players can often form a community of like-minded players. There are numerous technical approaches for fostering these online communities using the existing gaming platforms. For example, it is common for players to link accounts or otherwise connect their existing accounts or profiles via the gaming environments. In one example, the Steam® platform allows users to have a contacts list and users can join various games on the platform with fellow users. Not only do users share common experiences playing the same game, but often can compete as teams or against each other.

Currently, there are no dynamic solutions for fostering community in the livestream or game clip distribution processing environment. Users can note the screen name of a particular player and then seek to follow that player's livestream content. But where multiple players may be competing in the same game, there are no solutions for using the livestream or clip distribution platform to detect common gameplay.

As users engage in common gameplay, they often compete with or against other users without knowing each other's identities. As some players can generate streaming content, the other players may be unaware that their gameplay is being distributed. The other players may enjoy viewing their gameplay, as seen through the view of their co-players. The other players may also wish to know the streaming profiles of their co-players.

Unless the user actively knows the screenname and stream id(s) of coplayers, the user has no way of knowing if his or her gameplay is being distributed. Similarly, there are limited techniques for determining who you were playing with, aside from connecting with the user, via their online id, outside of the game itself. As such, there exists a need for dynamically detecting cooperative gameplay without requiring users to manually or collectively determine and share gaming identities.

BRIEF DESCRIPTION

The present method and system uses at least one database of hash values generated based on image processing of designated portions of gameplay image capture. As users engage in gameplay, an executable application, typically a locally-executed application, processes screen grabs and selects at least one pre-determined section of the image in the screen grab. This section is based on the game, whereby the section includes a common display area visible to all players.

Image processing of the section generates a hash value, where the hash value may also include a time factor. For each player running the executable application, these hash values are generated on an intermittent basis and the hash values are sent via a network connection to one or more hash databases. The database(s) stores the hash values for various players. The hash value generation may also be performed by the locally-executed software application.

The method and system electronically detects users engaged in common gameplay, including comparing the first hash value with a plurality of hash values stored in the central hash value database. The method and system determines matches between the hash values.

Based on this detection, the method and system determines additional user(s) engaged in the common gameplay.

In further embodiments, each of the local execution software transmits the hash values to a comparison server. The generation of hash values can be at a defined sequence of events, for example generating hash values for every selected frames, e.g., 1 second apart, 5 seconds apart, 60 seconds apart, 5 minutes apart, or any other time interval. The comparison server receives the various hash values from different connected computing devices, storing the hash values into a central repository, the hash value can include a time factor as determined by a clock function synchronized by the processing application.

In this embodiment, the comparison server performs the operations to compare the first hash value with the plurality of hash values. If a matching hash value is found, this can be defined as the second hash value and this commonality between the first hash value and the second hash value indicates a strong likelihood that the first user and the second user, the second user being associated with the second hash value, where engaged in common gameplay.

In further embodiments, common gameplay can be validated by comparing further hash values. It is appreciated that while the first user and the second user are engaged in common gameplay, they will continue to generate identical hash values. Therefore, further comparison operations with matching results can confirm the common gameplay.

In one embodiment, after the common gameplay has been validated, the method and system can include recording and/or distributing the association between the first user and the second user. For example, one type of distribution may be notifying the first user the screen identity of the second user, indicating that they shared gameplay. For example, one type of distribution may be notifying a fan or follower of a first user that the second user was also playing the same video game. Further examples are within the scope herein, including for example but not limited to supplementing livestream or other content distribution feed(s) or sharing platforms or social media postings.

In one embodiment, the analysis of the first portion of the first frame is performed using a computer vision processing routine. It is recognized that other techniques may be utilized, as recognized by a skilled artisan.

A better understanding of the disclosed technology will be obtained from the following detailed description of the preferred embodiments taken in conjunction with the drawings and the attached claims.

DETAILED DESCRIPTION

The present method and system operates both for generating hash values for storage, as well as generating hash values for comparison operations. As described herein, as each player engages in gameplay, executable application(s) are capturing screen content, whereby additional processing routines are performing image analysis on one or more sections of the screen content and generating hash values based on the image analysis. These hash values are sent to one or more central repositories.

The hash values can be then centrally stored in one or more central databases, storing hash values from multiple users. At the server or repository level, the server continuously receives and stores various hash values. The values can be both stored as well as used for data comparison/matching routines.

Figure 1:
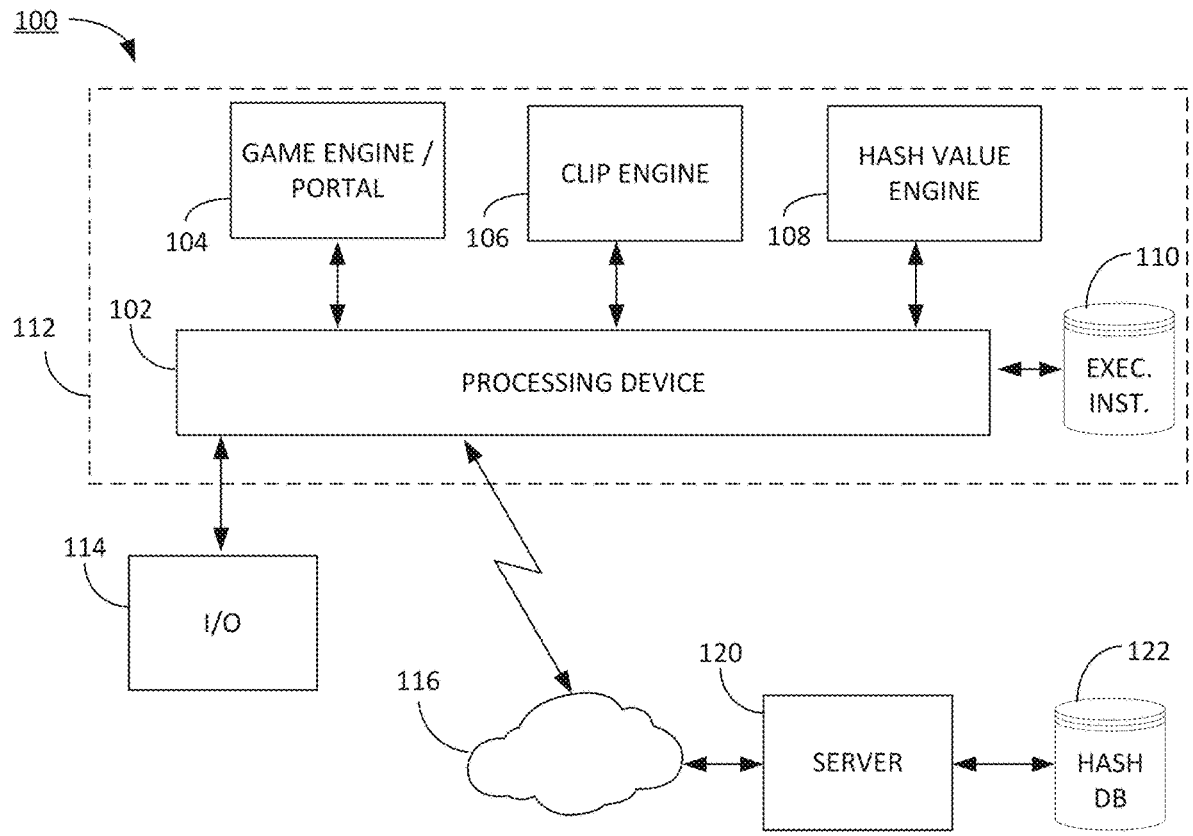
FIG. 1 illustrates a block diagram a processing device for electronically detecting a user engaged in common videogame gameplay with one or more other users.

The FIG. 1 system illustrates one embodiment, operating at the local processor level, whereby the central repository receives hash values from a large number of feeding systems (e.g., separate gaming computers) running similar operations to the processing operations of FIG. 1.

FIG. 1 illustrates one embodiment of a computing system 100 providing a computerized method of electronically detecting users engaged in common videogame gameplay.

As used herein, common videogame gameplay is where two or more users are playing within the same videogame instantiation or event. For example, if a game is played via a network-connected gaming server, there are any number of users actively playing within the same game. These users playing the common videogame gameplay by competing in the same videogame.

The system 100 includes a local processing device 102 with multiple processing engines/modules, including a game engine/portal 104, a clip engine 106, and a hash value engine 108. The processing device 102 further includes a computer readable medium, non-transitory medium, having executable instructions stored thereon, the processing device performing operations in response thereto.

The processing device 102 can be disposed on a local computing device 112, for example but not limited to a laptop computer, desktop computer, tablet or any other suitable gaming or computing device.

The system 100 includes an input/output component 114 for user interaction with the gameplay, as well as connectivity to a network 116. The network 116 provides communication to the server 120 and the server includes a hash value database 122.

The processing device 102 can be any suitable processing device or devices disposed within the computing system 112, including for example existing graphical and central processing units performing computer processing operations in response to the executable instructions.

It is recognized by a skilled artisan than many processing elements are omitted from the device 112 for brevity purposes only and are within known processing operations. For example, the processing device 102 can include known techniques for data communication and data sharing with the server 120 via the network 116, as well as known techniques for processing input/output operations via the interface elements 114.

In one embodiment, the game engine/portal can be an executable application itself or an application running on a secondary platform, for example running on a browser application or a gaming engine application. The engine/portal 104 allows for user access and execution of videogame games, including network access for multi-player games with other game players across networked connections. In one embodiment, the engine/portal can be a software enabling the gaming applications, by way of example but not limiting in nature being a Steam® application available from Valve Corporation.

The executable operations noted herein are not expressly limited to a game engine/portal or content distribution platform, but can also be executed within any suitable platform having user activities thereon. For example, in one embodiment the processing operations noted, including the image capture, image processing, and/or hash value generations can be performed in a social media platform, or any other type of platform, for determining common gameplay. For example, if users are engaged in gameplay on a social media platform, the present method and system can provide for detecting common gameplay.

Not specifically illustrated, the processing device 102 can include any number of initialization and verification routines via the input/output 114 and the processing device 102. For example, a user may log into the engine/portal 104 with a user id and password, the processing device can further facilitate the network communication with one or more gaming servers (not expressly illustrated) across the network 116.

In one embodiment, the clip engine 106 can be one or more executable software applications generating one or more videogame gameplay clips. In one embodiment, the engine 106 can operate similar to the engine noted in U.S. Publication No. 2019/0262704, the disclosure of which is hereby incorporated by reference. In one embodiment, the engine 106 can operate similar to the engine for mobile application as noted in U.S. Pat. No. 11,188,760, the disclosure of which is hereby incorporated by reference.

The clip engine 106 can generate individual frames of gameplay content, based on acquiring gameplay content, such as content made available for livestream or other network-based distribution.

The hash value engine 108 includes one or more processing elements for processing one or more frames of gameplay and generating a hash value associated therewith. As described in greater detail below, the present method and system takes advantage of static display elements within various games, such that while each individual player views different on-screen displays, these static fields are shared by common players.

The hash value engine 108 operates by processing a frame image of videogame gameplay, the frame image acquired by the clip engine. The frame image is of gameplay and based on the game itself, the engine 108 determines at least a portion of the frame image to capture. The engine 108 may include receiving a game identifier from the clip engine 106 or from the processing device 102 and accessing an instruction field indicating where the portion is located. For example, the portion may be an upper right window indicating multiple gaming elements, such as time of gameplay, team health level, etc. Here, the portion of the frame image is the same for all common players.

In one embodiment, the hash value engine 108 can also include a time factor as part of the hash generation operation. Where computing devices include internal clocks, there exists enough processing variations that many processing device clocks are at different time settings, having variations in milliseconds and larger. Therefore, the processing device 102, via the executable instructions 110, can acquire a master clock or synchronized time. In one embodiment, the synchronized time is utilized for finding common gameplay via the game engine/portal 104 and thus the processing device 102 acquires or resets a master clock time value via the engine/portal 104. For example, in an initialization operation, the processing device 102 can acquire a master clock start time from the portal 104, that time value being synchronized across all processing devices engaging the portal 104, as described in greater detail in FIG. 2 below.

The engine 108 can then extract the portion and perform a processing operation to translate the portion into a hash value. In one embodiment, that can be performed using a machine vision operation to process the portion into a hash value.

In one embodiment, the hash value can include a time component, but it not expressly required. For example, the time component can be added to the front of the hash value in one embodiment and added to the back of the hash value in another embodiment. Wherein the time component is a synchronized time component.

Generation of the hash value can utilize any suitable hash value generation routine as recognized by a skilled artisan. Herein, the end result provides the benefit, the hash value being based on the information acquired from extracted portion(s) of the gameplay output, as well as including time components in various embodiments.

The input/output elements 114 can be any suitable user interface and output components, for example a keyboard, mouse, joystick, monitor, speakers, headphones, etc. These elements 114 provide for user gameplay and other functions as noted herein.

The server 120 can be one or more network-based servers performing matching operations as described herein. The server 120 can include additional functional elements and is not expressly limited to matching operations, for example the server 120 can also include gaming functions, social media functions, content distribution functions, etc.

Figure 2:
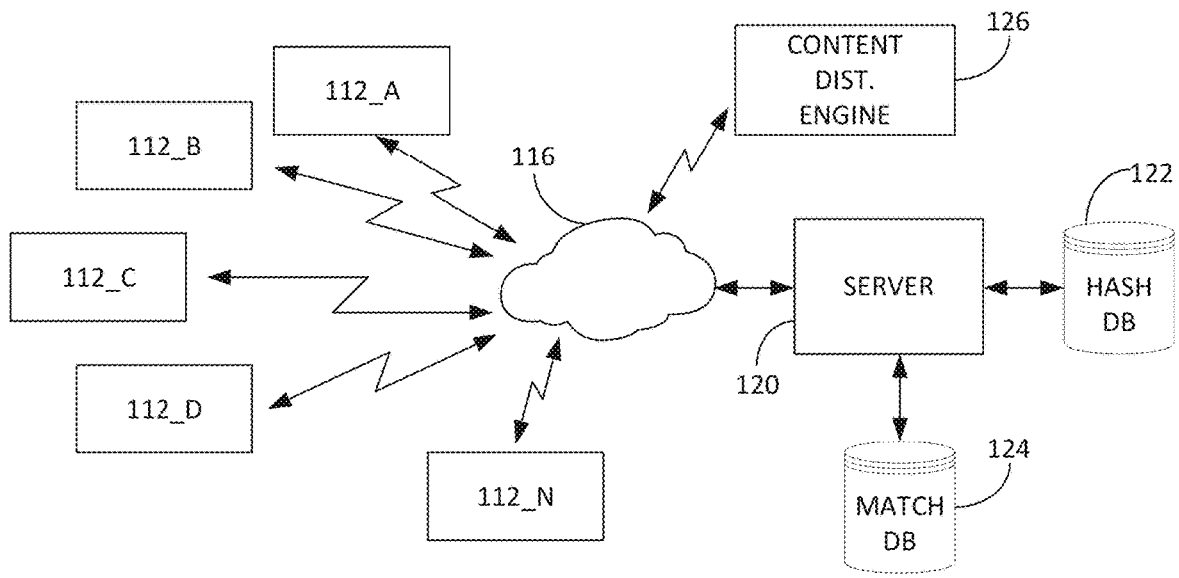
FIG. 2 illustrates a block diagram of a processing system including a plurality of different users accessing a comparison server for detecting users engaged in common gameplay.

The hash database 122 is one or more databases disposed within the network environment for storing hash values thereon. The hash values can be any string value of data elements representing a translation or interpretation of the extracted frame portion from the engine 108. The database 122 can be the central repository receiving hash values from multiple users engaging in gameplay.

Where FIG. 1 illustrates a single user processing device 112, the present method and system operates both with the single device 112, but also within a multi-user environment. FIG. 2 illustrates the broader multi-user embodiments.

In FIG. 2, there are any number of individual processing devices, illustrated generally as 112_A, 112_B, 112_C, 112_D, and 112_N, where N is any suitable integer. For example, the server 120 may interact with hundreds or thousands of individual computers 112 providing hash values to the hash database 112. For example, the processing devices 112 can generate unique hash values on regular intervals, for example sending a new hash value every 5 seconds. Thus, the server 120 is constantly receiving streams of hash values and storing them within the database 122.

Visible in FIG. 2 is a content distribution engine 126. This engine 126 can include one or more engines for distributing gameplay content, for example livestreaming content or clips of gameplay. In one embodiment, the engine 126 can distribute content via laptop and/or mobile devices, including for example the Medal.tv® engine available via web content distribution and mobile device applications.

In further embodiments using the content distribution engine 126, the operations of the processing devices 112 can also be performed via a networked location and is not expressly limited to desktop or local operations. For example, if the content is being captured and distributed, the image analysis performed by the clip engine (FIG. 1 element 106) and the hash value generation (FIG. 1 element 108) can be done in a network location.

Further illustrated in FIG. 2, the server 120 communicates with a match database 124. This database 124 stores matched content. As noted in further detail below, when hash values match, this indicates common players in gameplay. The match database 124 can therein store the matched data, for example indicating that player A was playing a specific game with player B as the same time.

The matching operations can be individual matches as well as continues matching. For example, a single match can indicate a high likelihood of common gameplay, but one embodiment may include verification of common gameplay by seeking additional matching hash values. Whereas, if the local systems are generating updated hash values at defined intervals, e.g., every 1 second, every 5 seconds, or any other suitable interval, then these users will have additional matching hash values. Therefore, common gameplay verification can include determining at least a minimum number of matching hash values, for example over a set period of time.

Figure 3:
FIG. 3 illustrates a sample screenshot of an image frame of a user engaged in videogame gameplay with a portion of the frame image.

FIG. 3 illustrates a sample screen grab image 200 of a user engaged in gameplay. In this screengrab, there are multiple users engaged in an online multi-player game. For example, this game may be an immersive world fantasy game with multiple players teaming up together to join in a quest or compete against other users.

The game display includes various general user interface features. For example, a game statistic bar 202 can be displayed in the upper right hand corner. The screen 200 can include avatars or blocks of other players 204, a map feature 206 and a user's statistic bar 208 at the bottom corner.

The screen image 200 is the viewable screen of the first user playing the game. The other players playing the same game, engaged in common gameplay, will see a different viewable screen, but will likely have one or more common display elements.

For example, the game statistic bar 202 can be common to all gameplayers. Therefore, based on the screen grab and knowledge of the game being played, the executable application determines the game being played and the screen portion to examine. Here, the screen portion is the bar 202.

In one embodiment, using computer vision or other processing routines, the data of the portion is analyzed and processed into a hash value. As noted above, the hash value generation can use any suitable processing routine as recognized by a skilled artisan.

In one embodiment, the hash value can include image data as well as other common data to gameplay. For example, the data can include clock data, such as clock data generated from a local processing unit, clock data generated from within the game itself, identifier data associated with the instantiation of the game, or any other suitable data as recognized by a skilled artisan. As noted above, one embodiment includes a master clock synchronization factor ensuring all instances of gameplay on disparate computing devices are generating time-inclusive hash values based on the same clock.

Figure 4:
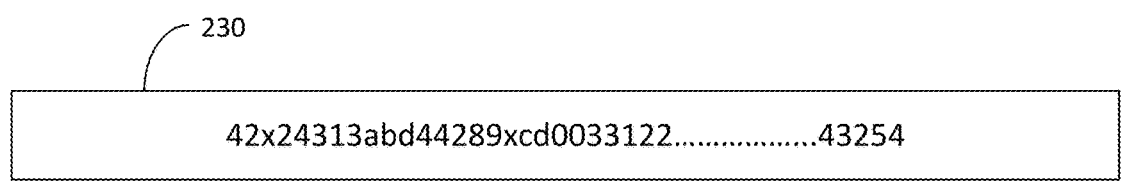
FIG. 4 illustrates a sample hash value.

FIG. 4 illustrates one of a sample hash value. In this embodiment, the hash value 230 is a multi-digit unique number generated based on the image data as well as any other data fields. The length of the hash value can be any suitable length, long enough to be unique and minimize false matches.

As noted in FIGS. 1 and 2 above, the hash values are generated at regular intervals during gameplay. In the example of hash values being generated every 5 seconds, the local processor grabs a frame image at every interval and generates a unique hash value. Each hash value is the transmitted to the central server, either continuously sent upon being generated or stored and sent in a batch upload at defined intervals, e.g., sending a new hash value every minute or every 5 minutes.

In one embodiment, the intervals for generating separate hash values can be based on processing load, as well as volume for storing and comparing hash values. With unlimited processing power and storage, hash values can be generated in shorter intervals, but one embodiment includes designating hash value generation at once every 1 minute or even once every 5 minutes. In this embodiment, the hash value generation operations do not deter from processing load associated with the gaming operations and do not generate an unwieldy volume of hash values, which would require further processing load and inherent delay for reviewing the cache values to find matches.

As noted herein, the method and system can provide for authentication of matches, as well as eliminating false positives, by finding multiple matches between users. A single match may be deemed unreliable, thus if users are engaged in common gameplay over a period of 10 minutes and hash values are generated every 1 minutes, common gameplay can be validated by finding multiple matches generated over this 10 minute common gameplay interval.

Figure 5:
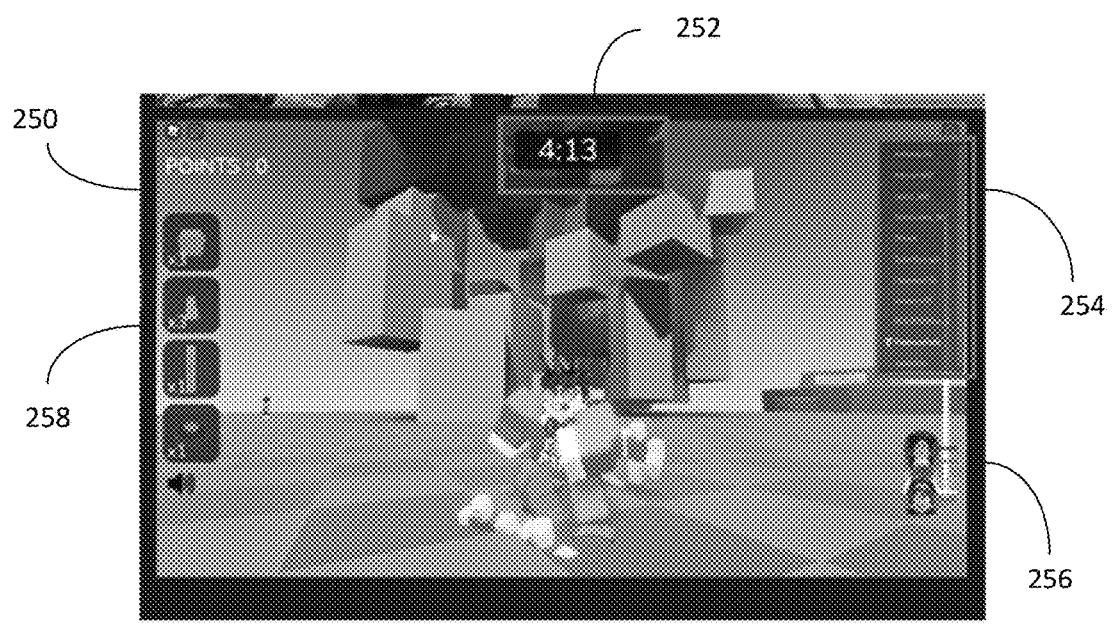
FIG. 5 illustrates another sample screenshot of an image frame of a user engaged in videogame gameplay with a portion of the frame image.

The hash value can be based on one element within a display or can include multiple display elements. FIG. 5 is a sample gameplay screenshot 250. This display includes a time bar 252, player fields 254, avatars 256 and element blocks 258. Similar to FIG. 3, each user engaged in common gameplay with see different view screens but are likely to have one or more portions displaying identical images.

In the processing of the screenshot 250, the processor can detect in this example 2 portions of the screen 250. Here, the time bar 252 and the player fields 254 are going to be identical by all common players.

Figure 6:
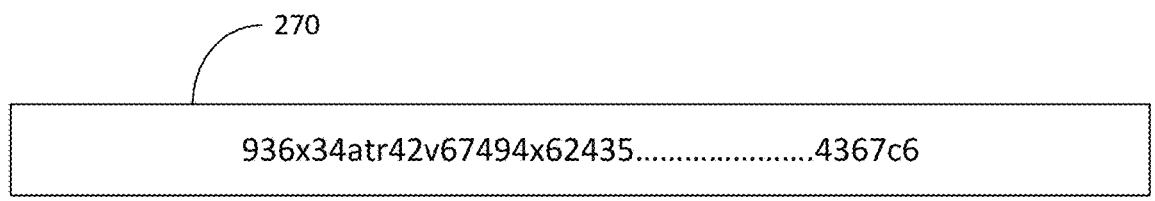
FIG. 6 illustrates another sample hash value.

Using the hash value generation algorithm or processing routine, FIG. 6 illustrates a sample hash value 270 representing at least the two portions of the display 250, portion 252 and portion 254. Similar to FIG. 4, the hash value 270 can also include additional data fields associated with the game, as recognized by a skilled artisan.

Figure 7:
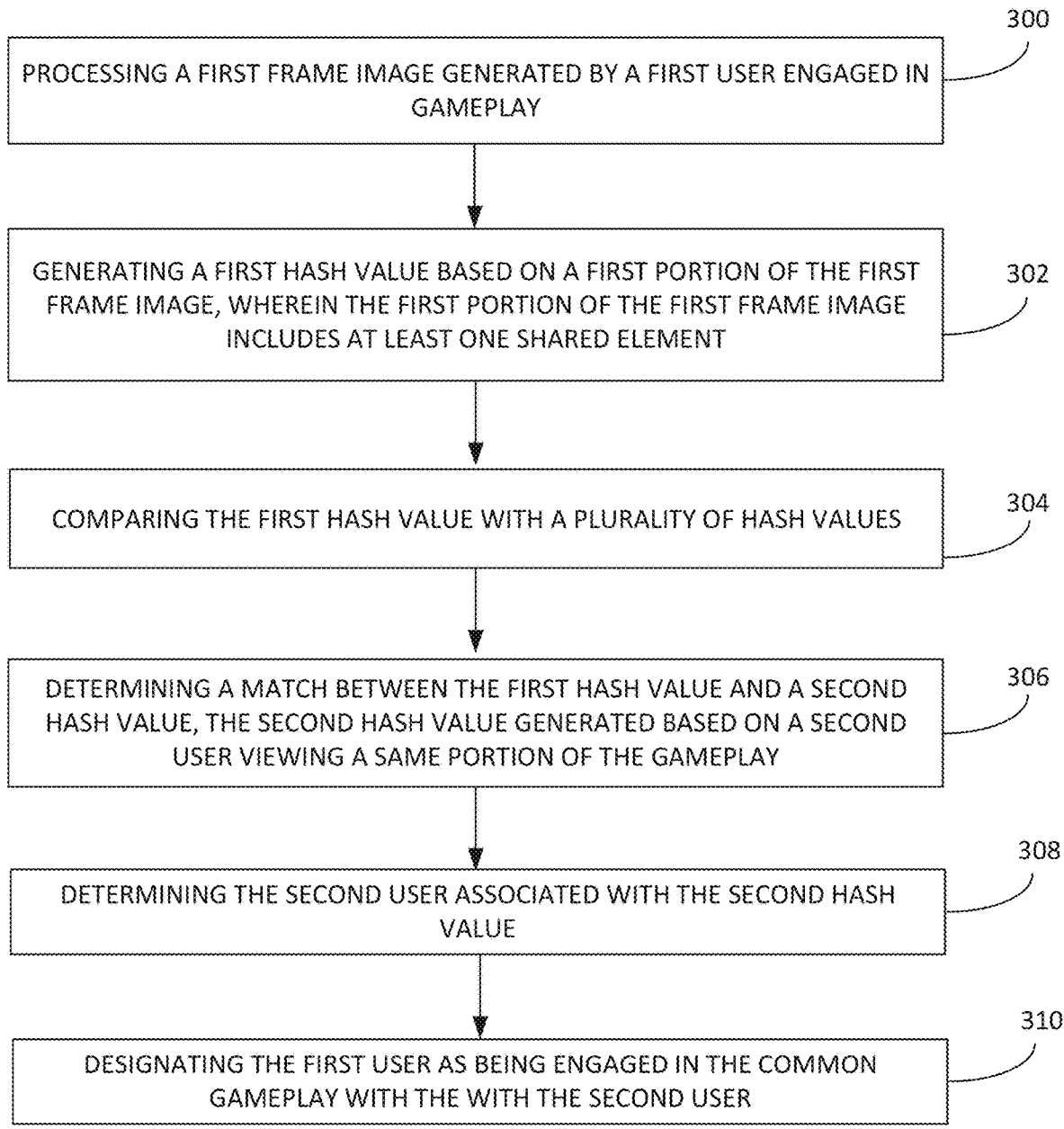
FIG. 7 illustrates a flowchart of the steps of one embodiment of a computerized method for electronically detecting a plurality of users engaged in common gameplay.

FIG. 7 illustrates a flowchart of the steps of one embodiment of a method for electronically detecting users engaged in common gameplay. The steps of FIG. 7 can be performed using the operating systems noted above, for example FIGS. 1 and 2.

Step 300 is processing a first image frame by a first user engaged in gameplay. Step 302 is generating a first hash value based on a first portion of the first frame image, the frame including at least one shared element for the various users engaged in common gameplay. The method may include uploading prior hash values to a central repository, along with various other users additionally uploading their hash values.

Step 304 is comparing the hash values. In comparing, the method can either not find a match, whereby there may not be any common gameplay users or can find one or more matches. Step 306 is determining matched between the first user and at least a second user, where the match is the hash values are identical.

With knowledge of the second hash value, step 308 is determining the identity or other identifier of the second user and step 310 is designating the first user being engaged in common gameplay with at least the second user.

The method and system can operate continuously for on-going gameplay. For example, one gameplay environment may include six different players competing with and/or against each other. Each of the six players includes the local processor application for capturing gameplay and generating hash values. In this embodiment, the hash values can be based off a frame captured once every five seconds. Therefore, each individual player generates 12 hash values per minute, with six players that is 72 total hash values per minute. If the game lasts 10 minutes, the group generates approximately 720 hash values.

These hash values are uploaded or otherwise transmitted to the server, including a comparison server performing the comparing operations. The method and system can use any suitable comparison or filtering operation, detecting common hash values.

In one embodiment, the hash values are stored for comparison, but are additionally logged or references to the original source. For example, one embodiment may include a look-up table or other reference for a player identified by any suitable identifying information, e.g., a user id, an avatar, a screen name, an IP address, etc. Using the reference database in addition to the comparison provides for not only detecting identical hash values, but also determining the users.

Upon detection of common gameplay, the server 120 or any other suitable network or local processing device, can perform additional processing operations based thereon. For example, one embodiment may include notifying users of the matched users and transmitting an identifier on a shared platform, for example within the gaming platform.

Another example can be notifying the user that a common gameplay user may be streaming or otherwise distributing gameplay content. For example, a message can indicate that the user may wish to see another user's videogame feed which was determined to include common gameplay. Another example can be providing shared gameplay user identifications as part of a recommendation or other suggestion engine, for example recommending a connection with one or more platforms.

Another example can be generating tracking details for users engaging in gameplay, including types of game, common players, and other data. For example, one embodiment may track common or overlapping gameplay and determining relationships between various users, games, platforms, etc.

Figure 8A:
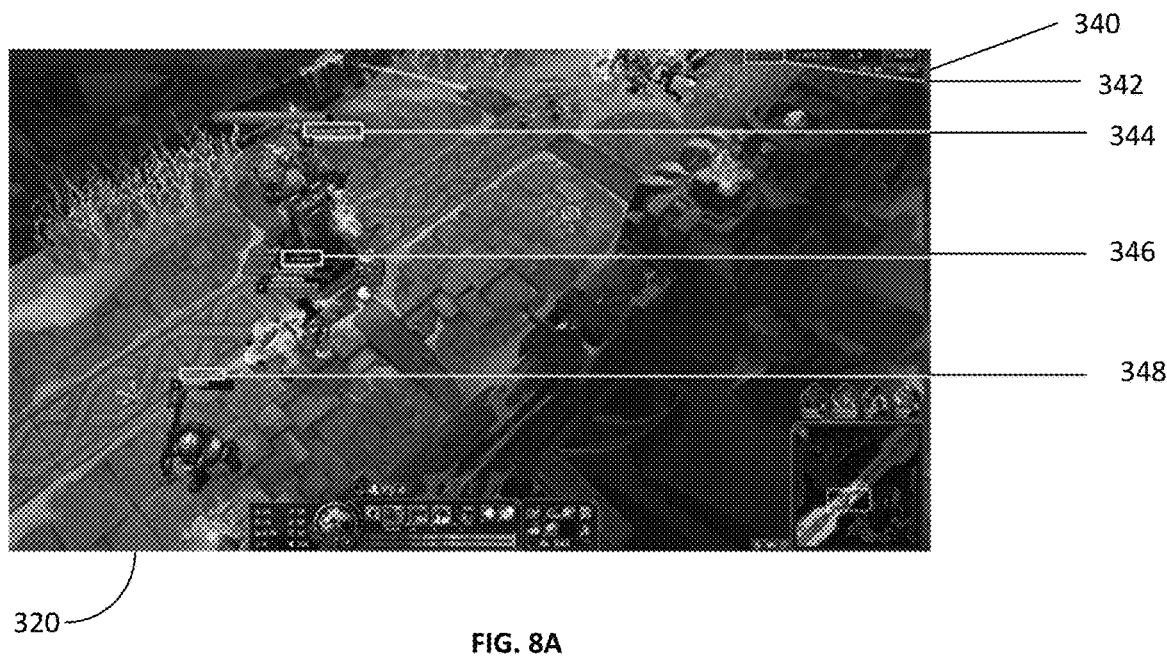
FIGS. 8A and 8B illustrate sample gameplay screenshots illustrating common gameplay detectable by shared on-screen elements.
Figure 8B:

For further illustration of the common gameplay, FIGS. 8A and 8B illustrate two users engaged in common gameplay. FIG. 8A illustrates a first screen capture 320 from the first user's perspective. FIG. 8B illustrates a second screen capture 330 from the second user's perspective. Both users are playing the same game, as different characters.

In prior systems, the only way to determine that users are playing together is if both users know each other and somehow notify the system they are engaged in common gameplay. For example, if each player was livestreaming his or her gameplay, they may reference that they are actively playing with each other.

In the present invention, the method and system operates by using the screen grabs/image capture running at the local level. The processor, knowing the game being played, determines which portion or portions of the screen to analyze.

As visible in FIGS. 8A and 8B, this exemplary embodiment includes 5 common portions. Portion 340 in screen 320 is identical to portion 350 in screen 330, showing a time bar. Portion 342 in screen 320 is identical to portion 352 in screen 330, a life bar. Portions 344, 346, and 348 in screen 320 are identical to portions 354, 356, and 358 in screen 330, in-game character identifiers.

Whereby, the method and system generating hash values based on image analysis of one or more of these portions, will generating identical hash values for screen 320 and screen 330. With these hash values send to a central location and a comparison operation being performed, the comparison server therein determines that the user that generated screen 320 is engaged in common gameplay with the user that generated screen 330.

In an alternative embodiment, the method and system may utilize port lookup functionality instead of machine vision or other image processing routines.

In another embodiment for detecting common gameplay, the processing operations may utilize port scanning operations and detect common or overlapping port assignments. This embodiment can include a processing operation performing a local port scan, allowing for seeing who is connected to or assigned various ports.

In one embodiment, the port look up operations can detect common gameplay where there are limitations on finding matches via the computer vision and hash value generation routines. This embodiment can be located in a secondary processing layer and looks up the game the user is playing. Knowledge of the game being played can be acquired using any known processing techniques as recognized by a skilled artisan. In another the game lookup can be performed by a doing a port lookup. This processing can then determine via a scanning operation, the IP address the user is connect to on that port.

This port lookup operation can be based on known port values games, for example Minecraft® servers all run on port 25565. This port lookup operation can also be based on a secondary comparison or reference operation to first determine the port value and the determine the game associated with the port value.

Herein, the determination of common gameplay can use the port and IP address features to detect multiple users engaging in the same gameplay. Upon detection, the method and system can use this common gameplay determination consistent with techniques noted above.

In another embodiment, the processing operations can seek utilization of additional processing information for detecting common gameplay. For example, the processing operations can examine process-related details to find server information, such as a Match ID, server IP address, or other suitable information. The matching of players for detecting common gameplay can be based off this server information.

The above embodiments include locally executable processors for performing content recognition and hash value generation. Further embodiments can include non-local based processor(s) to perform this operation and the present invention is not expressly limited to local-based processors.

For example, where the user is distributing gameplay content, for example generating a livestream or other content feed, one or more edge servers may be utilized to perform the processing the frame image and generating hash value based on the content feed. Herein, the processing operations can grab an image frame within the stream and perform the operations at one or more network levels.

FIGS. 1 through 8 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. As used herein, executable operations and executable instructions can be performed based on transmission to one or more processing devices via storage in a non-transitory computer readable medium.

What is claimed is:

1. A computerized method of electronically detecting a plurality of users engaged in common gameplay of a videogame, the method comprising:
   processing a first frame image generated by a first user engaged in gameplay;
   generating a first hash value based on a first portion of the first frame image, wherein the first portion of the first frame image includes at least one shared element from the plurality of users engaged in the common gameplay;
comparing the first hash value with a plurality of hash values and determining a match between the first hash value and a second hash value within the plurality of hash values based thereon;
determining a second user associated with the second hash value; and
designating the first user as being engaged in the common gameplay of the videogame with the second user.

2. The computerized method of claim 1 further comprising:
processing the first frame image using a locally-executable software program capturing gameplay content; and
the generating the first hash value being performed by the locally-executable software program.

3. The computerized method of claim 2 further comprising:
transmitting the first hash value to a comparison server across a network communication, such that the comparing the first hash value with the plurality of hash values is performed by the comparison server.

4. The computerized method of claim 1 further comprising:
processing a second frame image generated by the first user engaged in the gameplay;
generating a third hash value based on processing the first portion of the second frame image;
comparing the third hash value with the plurality of hash values and determining a match between the third hash value and a fourth hash within the plurality of hash values based thereon;
determining the second user associated with the third hash value; and
confirming the first user as being engaged in the common gameplay of the videogame with the second user.

5. The computerized method of claim 1 further comprising:
determining the videogame associated with the common gameplay;
determining the first portion of the first frame image based on the videogame.

6. The computerized method of claim 1 further comprising:
transmitting the designation of the first user being engaged in the common gameplay with the second user to a videogame content distribution system.

7. The computerized method of claim 1, wherein the generating the first hash value is performed using a computer vision processing routine.

8. The computerized method of claim 1 further comprising:
synchronizing a processing clock based and determining a time value therefrom; and
adding in the time value within the first hash value.

9. A computerized method of electronically detecting common gameplay of a videogame, the method comprising:
receiving a plurality of hash values, each of the plurality of hash values indicating at least one portion of video frames of videogame gameplay from a plurality of users;
comparing each of the plurality of hash values;
if more than one of the plurality of hash values are matching, determining each of the plurality of users associated with each of the plurality of hash values that match to generate a plurality of matching users; and
designating the matching users as engaged in common gameplay of the videogame.

10. The computerized method of claim 9, wherein the at least one portion of the video frames are based on the videogame.

11. The computerized method of claim 9, wherein the receiving the plurality of hash values is across at least one networked connection such that the generation of hash values is performed by at least one locally-executable software application running concurrent with the videogame.

12. The computerized method of claim 9 further comprising:
transmitting the designation of the matching users to a videogame content distribution system.

13. A computerized system for electronically detecting a plurality of user engaged in common gameplay of a videogame, the system comprising:
a local processing device in response to local executable instructions stored within a local computer readable medium, the local processing device operative to:
process a first frame image generated by a first user engaged in gameplay;
generate a first hash value based on a first portion of the first frame image, wherein the first portion of the first frame image includes at least one shared element from the plurality of users engaged in the common gameplay; and
a network processing device in response to network executable instructions stored within a network computer readable medium, the network processing device operative to:
compare the first hash value with a plurality of hash values and determining a match between the first hash value and a second hash value within the plurality of hash values based thereon;
determine a second user associated with the second hash value; and
designate the first user as being engaged in the common gameplay of the videogame with the second user.

14. The computerized system of claim 13 further comprising:
the local processing device is operative to:
process a second frame image generated by the first user engaged in the gameplay;
generate a third hash value based on processing the first portion of the second frame image; and
the network processing device is operative to:
compare the third hash value with the plurality of hash values and determining a match between the third hash value and a fourth hash value within the plurality of hash values based thereon;
determine the second user associated with the third hash value; and
confirm the first user as being engaged in the common gameplay of the videogame with the second user.

15. The computerized system of claim 13, wherein the local processing device is further operative to:
determine the videogame associated with the common gameplay;
determine the first portion based on the videogame.

16. The computerized system of claim 13, wherein the network processing device is further operative to:
transmit the designation of the first user being engaged in the common gameplay with the second user to a videogame content distribution system.

17. The computerized system of claim 14, wherein the generating the first hash value is performed using a computer vision processing routine.

18. The computerized system of claim 14, wherein the local processing device is further operative to synchronize a processing clock and determine a time value therefrom, as well as add in the time value within the first hash value.

* * * * *